Nov. 4, 1958

R. C. DARNELL 2,858,941

FUEL FILTER

Filed Oct. 22, 1953

INVENTOR.
REX C. DARNELL
BY
Barnes, Kisselle, Laughlin & Raisch
ATTORNEYS.

Nov. 4, 1958

R. C. DARNELL 2,858,941

FUEL FILTER

Filed Oct. 22, 1953

INVENTOR.
REX C. DARNELL
BY
Barnes, Kisselle, Laughlin & Raisch
ATTORNEYS.

Nov. 4, 1958  R. C. DARNELL  2,858,941
FUEL FILTER
Filed Oct. 22, 1953  5 Sheets-Sheet 3
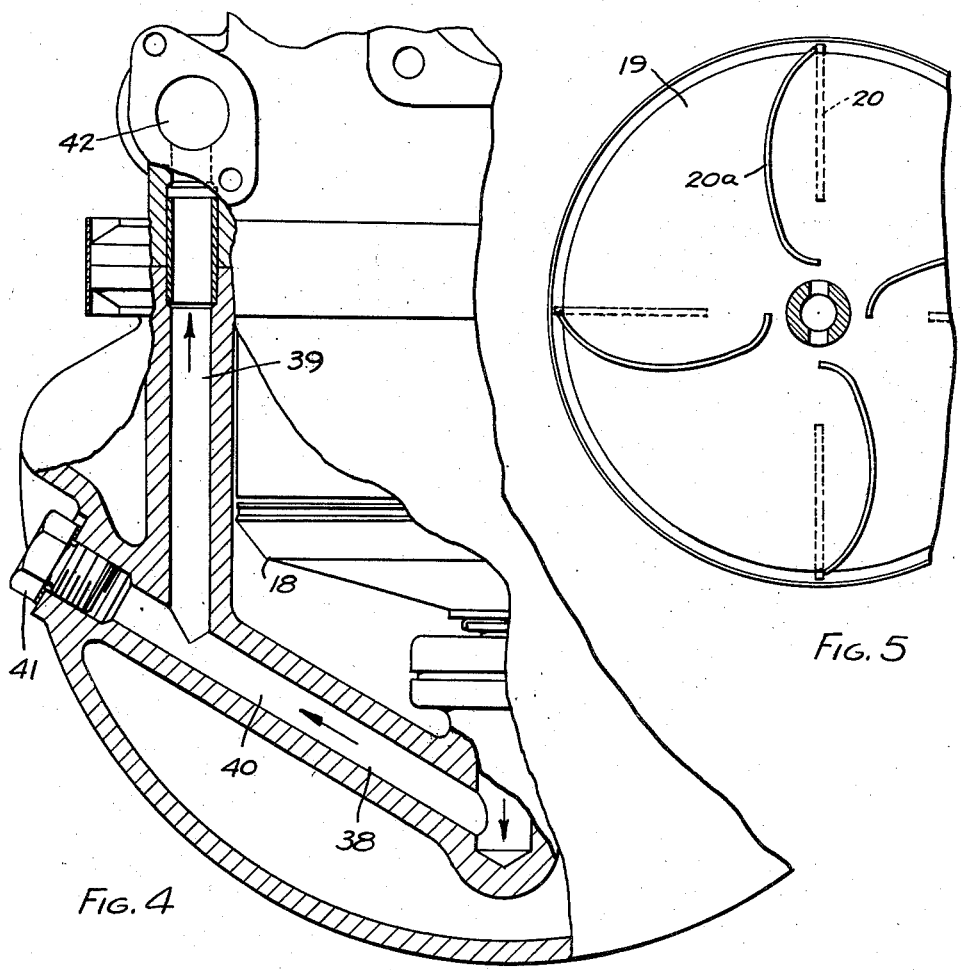
Fig. 4
Fig. 5
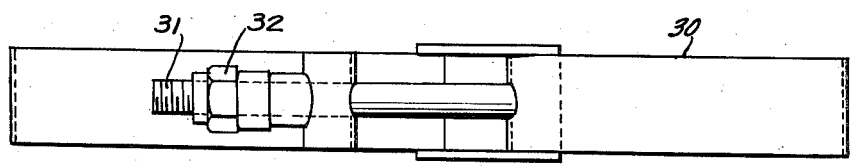
Fig. 6
INVENTOR.
REX C. DARNELL
BY
Barnes, Kisselle, Laughlin & Raisch
ATTORNEYS.

Nov. 4, 1958 R. C. DARNELL 2,858,941
FUEL FILTER
Filed Oct. 22, 1953 5 Sheets-Sheet 4

INVENTOR.
REX C. DARNELL
BY
Barnes, Kisselle, Laughlin & Raisch
ATTORNEYS.

Nov. 4, 1958  R. C. DARNELL  2,858,941
FUEL FILTER

Filed Oct. 22, 1953  5 Sheets-Sheet 5

INVENTOR.
REX C. DARNELL
BY
Barnes, Kisselle, Laughlin & Raisch
ATTORNEYS.

United States Patent Office 2,858,941
Patented Nov. 4, 1958

2,858,941

FUEL FILTER

Rex C. Darnell, Dexter, Mich., assignor to Michigan Wire Cloth Company, Detroit, Mich., a corporation of Michigan Application October 22, 1953, Serial No. 387,568

11 Claims. (Cl. 210—295)

This invention relates to fuel filters designed especially for use with fuel burning or jet engines. The filters heretofore used with such engines are usually the retention type embodying a screen which arrests the foreign material in the fluid and also arrests ice particles forming in the fluid. These filters are ordinarily incorporated in the line between the engine boost pump or low pressure pump and the high pressure pump, or are incorporated in the line between the high pressure pump and the control apparatus for the fluid, etc. going to the burners. The filtering screen in retention type filters will become clogged with particles of foreign matter and especially with small globular ice particles if not manually cleaned. The practice has been to utilize an automatic shunting valve which opens when the pressure differential across the filter element becomes excessive by reason of the filtering screen becoming partially or completely clogged. This pressure releasing valve opens under these conditions and shunts the liquid around the filter screen or element and passes same into the line leading to the high pressure pump or the burner controls without being filtered or purified. The passage of solid material, particularly and/or ice particles, into the burner controls results in mal-functioning of the burner controls.

The collection of globules of ice on the filter screen is particularly hazardous. A present means to obviate this has been to admit alcohol into the fuel either automatically by a pressure differential sensing device or by manual control when a red light signals the presence of ice in the fuel.

It is the object of the present invention to provide a filter which continuously backwashes and purges the filter of foreign material and ice particles and which then efficiently separates the purged material from the backwashing stream. Another object of the invention is to use only a very small volume of the liquid for this purging action. It is undesirable to divert a large quantity of fuel for backwashing purposes during the starting operation. To minimize the amount of fluid diverted for the backwashing or purging operation, the exterior of the cage of the cylindrical filter element is provided with a large number of separate sections, only one section at a time being open to the backwashing action. The purging action is shifted progressively from one section to the next by a shoe member rotating 8 to 10 times a minute. The purging action pregresses successively around the filter cage through approximately 60 separate sections and screening areas in one revolution of the shoe. With a fuel system delivering 75 gallons of fuel a minute, the purging or backwashing action is calculated to divert a minimum of fuel, approximately 1¼ gallons a minute.

Another important development in this filter is a valve for controlling the amount of the fuel diverted by the purging or backwashing action. This filter is designed to operate over a pressure range from 80 to 1000 pounds per square inch. By reason of the novel control valve, the amount of diversion is controlled by automatically regulating the valve opening in relation to the pressure in the fuel line.

Another feature of the invention is that a centrifuge is used for separating the foreign material and ice from the fuel in the backwashing process. This centrifuge has specific features of novelty in that it has a rotating drum with concave baffles.

The connections between the filter and the centrifuge for forming a passageway for the diverted backwash liquid and also for providing a mechanical driving connection between the rotating member in the filter and the centrifuge are a pair of hollow shafts sleeved one upon the other. The centrifuge is driven from 2,000 to 3,000 R. P. M.'s and the rotor in the filter, which provides an arrangement for reversing the liquid flow through the filter in successive small areas, is caused to rotate only 8 to 10 times a minute. A motor drives, at high speed, the shaft to which the centrifuge is fastened, and an outer shaft fastened to the rotor is driven at a much lower speed by reason of reduction gearing that has a very large ratio of reduction; namely, from 3,000 R. P. M.'s to 8½ R. P. M.'s or thereabouts. To accomplish this I use a differential planetary gearing system.

The motor for driving the high speed shaft may be a hydraulic motor, such as the "Root" type with the two 8 shape rotors or some other motor.

I use a novel feature in the hydraulic motor for this engine fuel feed. I purpose to use the same type of valve control as I do on the diverted backwash liquid for the purpose of adapting the motor to different pressures in the fuel line. This adapts a motor to pressures of wide ranges such as having 80 pounds per square inch to 1,000 pounds per square inch.

It is not new to provide a backwash or counter stream of fuel in successive limited areas of a filter for the purpose of purging or stripping a filter continuously clean. Such an arrangement is shown and claimed in the Britton Patent No. 2,101,211. But this Britton patented filter has only a settling chamber to separate the filtered-out material, and this is not nearly as effective and reliable as the centrifuge provided in the present apparatus; it is also heavy and bulky. The Britton apparatus has no control valve to adjust the fuel diversion stream size to the fuel line pressure. It could not meet the conditions required in fuel burning or jet engines.

Another feature of my self-purging filter is that the filter cage including the screening, is at all times stationary. The screen is not subject to friction by wiping movement of an element across the face of the screen and consequently will not be worn by such action. The screen is supported by a plurality of fins forming flutes for separate purging areas that are sequentially but separately purged, but only one area at a time, by the backwashing action.

The movement between the cage on the one hand and the diversion apparatus on the other hand is afforded by a rotor carried on the end of the slow turning hollow shaft and a universally supported shoe which connects the rotor passageways with the slots in the cage and lightly presses against the inside of the cage for successive connections at the many separate purging areas.

In the drawings:

Fig. 4 is a fragmentary elevation of the filter showing part of the sump casing broken away.

Fig. 5 is a section through the centrifuge taken on the line 5—5 of Fig. 1.

Fig. 6 is an elevation of the strap and ring that hold the sump bowl in place.

Figure 1:
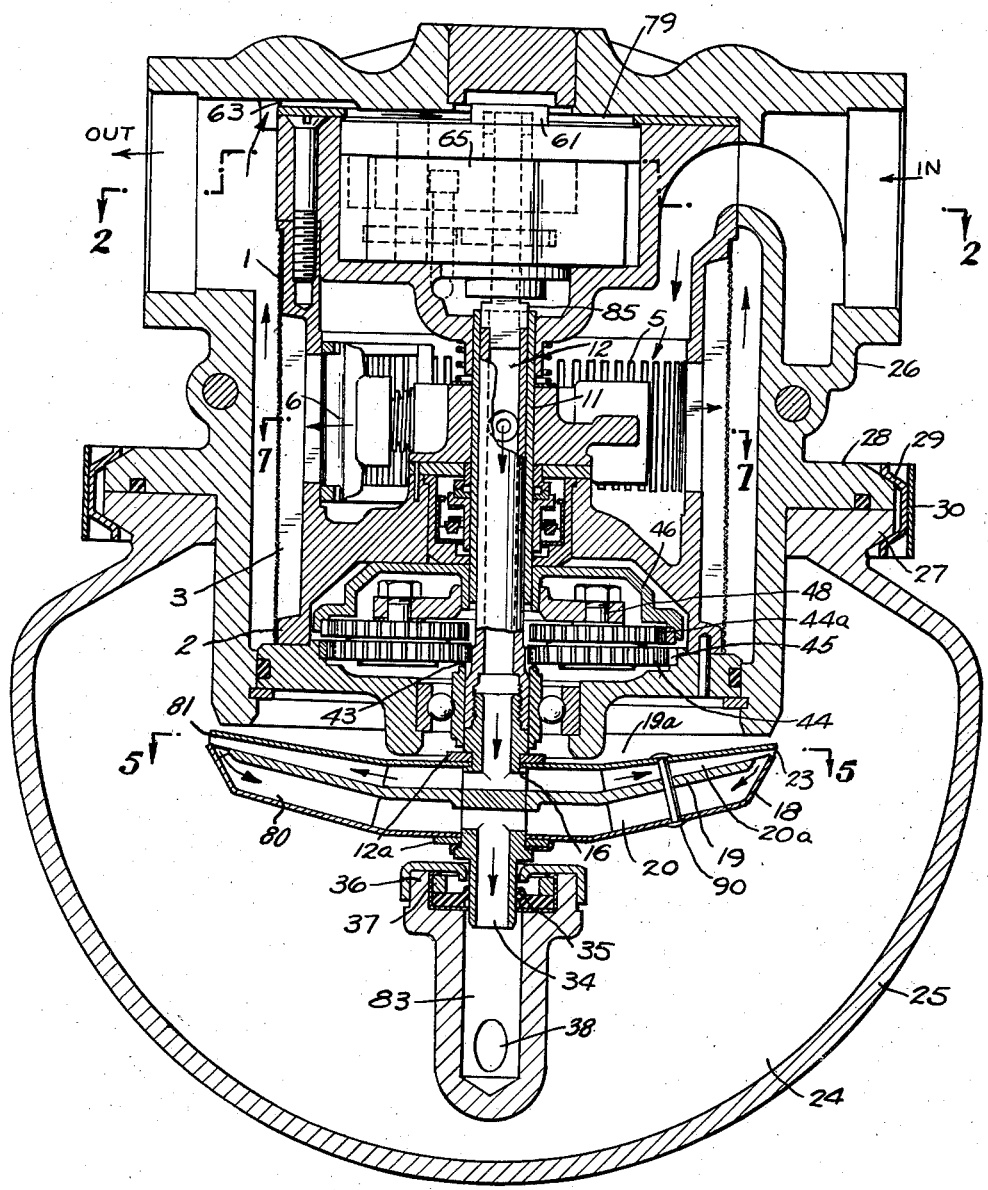
Fig. 1 is a longitudinal section of the filter.

Referring to Fig. 1: 1 is the filter media or screen that is secured to the outside of the cylinder that I call the filter casing or cage 2. This casing is provided with a plurality of fins 3 which form between the fins flutes 4. Slots 5 lead from the gullets of the flutes to the inside of the cage. These fins are preferably 60 in number. This particular filter has 60 independent areas, which are successively, but only one at a time, backwashed or purged.

The reason back of this number of flutes is that this particular design embraces an over-all flow of 75 gallons of fuel per minute through the over-all assembly at the normal rotational speed of the engine proper. During the starting of the engine, the volume delivered by the pumps at the extremely low speed induced by the starting system is such that there should be a minimum of dissipation of the pump delivery through any backwashing system. This is also true when the engine is "idling." But as large a flow as possible through the backwashing system is required so as to thoroughly purge all associated parts. The velocity of the backwash flow should be equal to that existing through the screen or other filter media during normal filtering operation. Co-relating the two requirements, that is, duplication of filtering velocities in the backwashing system and the minimizing of the volume of fluid that one can be devoted to backwashing, it is apparent that the greater number of flutes, the lesser the volume of the backwash flow while maintaining the velocity relationships desired. Practical evaluation of these factors dictate a diversion of 60 flutes. The number of 60 flutes produces a backwash volume of 1¼ G. P. M. which is allowable and at the same time gives the velocity desired for effectively removing impaled matter from the screen.

On the inside of the cage 2 is a slightly bossed ring of slots. This bossed ring of slots forms a raceway upon which the shoe 6 travels in a valving operation, being held against the raceway by the light coil spring 7. The shoe is fitted over the ball 8 on the end of the arbor 9 projecting from the rotor 10. This rotor is tightly fitted to the hollow shaft 11 which is sleeved on the inner hollow shaft 12. Shaft 11 has a port 13 and shaft 12, a port 14 which register with the valve chamber and each other many times a minute as shaft 12 travels 3,000 R. P. M.'s and shaft 11, 8¼ times a minute. These registrations are something like 6 times a second so that there can be practically a continuous flow of liquid from the inside of the arbor 9 and the chamber 15 into the interior of the hollow shaft 12. The number of flutes and the revolutions are given just by way of example.

The shoe rotating over the raceway and passing over the 60 slots in one revolution subjects the screen on the outside in 60 separate areas to the high pressure differential existing between the fuel line on the entrance side of the high pressure pump and the pressure of the fuel on the delivery side of the high pressure pump. This backwashing or purging therefore subjects successive areas on the outside of the screen to this high pressure differential as the shoe travels progressively over the slots. Hence, the filter is progressively backwashed and purged in small areas, one at a time, to keep the flow of backwashing or purging liquid to a minimum.

The shaft 12 has a hollow hub 16. This hub is screwed into the threaded end of the shaft 12 and secured to this hub is the washer 12A.

The centrifuge consists of an impeller-like part that is a saucer-like casting 19 having integrally cast thereon a series of curved vanes 20a on the entry side in Fig. 5, and a second set of radial vanes 20 on the outlet side as shown in the dotted lines. Enclosing this impeller-like part are two covers 18 and 19a acting to enclose and properly direct the backwashed fluid. These covers and the impeller are riveted together by rivets 90. It will be noted that the annulus existing between the impeller disc and the upper cover narrows as the diameter increases, the object of which is to achieve as high as practical fluid velocity as the fluid nears the outer periphery. It will be noted that there is an aperture 23 existing between the upper and lower covers, at their outer edges, which aperture is provided for the egress of foreign matter purged from the filtering screen by the backwashing fluid. It will be noted that a sharp reverse direction is imparted to the fluid in the region of the outer periphery, the object of which sharp reversal is to throw out of suspension deleterious material and centrifuge same through the aperture between the upper and lower covers into the quiescent zone existing in the sump.

The space between the outer drum and the inner disc forms an annular but tapered passageway 81 leading from the center of the drum to the periphery of the drum. In-as-much as the space narrows from the center to the outside of the drum and the vanes are curved, this accelerates the speed of the centrifugal force when this element is rotated some 3,000 R. P. M.

The maximum velocity of the liquid is attained adjacent the slots 23. The liquid reverses at the sharp bend inside of the slots and returns to the center at its natural velocity. This permits particles of relatively high specific gravity to be separated from the fluid carrying agent and flung through centrifugal force out of the centrifuge passageways into the relatively quiescent zone existing in the sump. Normally there is little fluid exchange existing between the centrifuge and the sump at the time of separation.

It will be noted that the area of the return passageway 80 is considerably greater than the outlet passageway 81. The increase of this return area acts to materially reduce the velocity of the fluid as it returns from the outer periphery to the central outlet. The object in lowering the velocity in the return portion of the centrifuge housing is to lower the frictional force that might carry a foreign particle that has escaped the exit slot 23 and enable the centrifugal force acting on this particle to throw same back out to the outer diameter against this frictional force of the carrying agent returning to the center.

Figure 9:
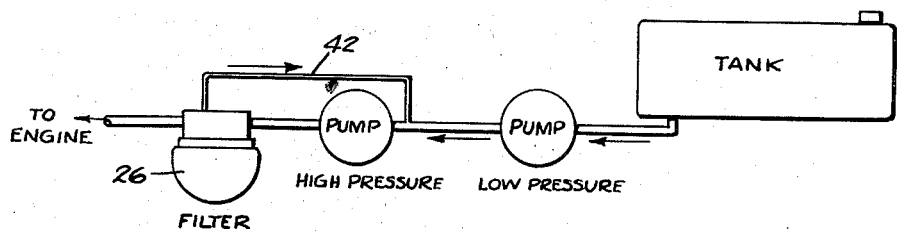
Fig. 9 is a schematic view showing the fuel line for the jet engine.
Figure 10:
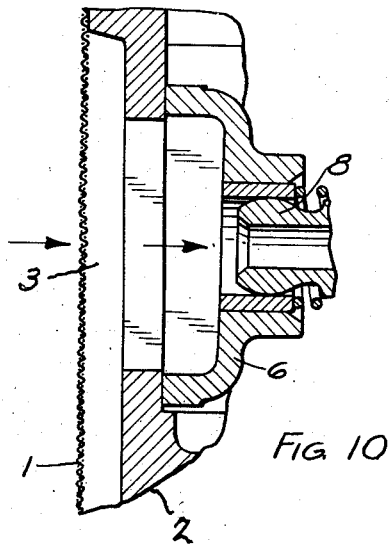
Fig. 10 is a section through the shoe on the line 10—10 of Fig. 7.

The separated material collects in the sump 24 which is formed by the sump bowl 25 which is removably fastened to the casing 26 enclosing the filter. The bowl has a flange 27 with a beveled portion and the casing has a flange 28 with a beveled portion upon which is secured a shallow V-like strap 29 by means of a ring 30 which is shown in elevation in Fig. 6. The V strap may be drawn in engagement with the beveled surfaces of the flanges by the bolt 31 and nut 32. The liquid passing through the centrifuge passes into the right hand hub 34 which turns in a seal member 35 which is supported in the journal box 36 which is part of a casting which forms the sump bowl. The liquid passing from the hub 34 into passageway 83 and then through tubular column 38. The sealing ring 37 provides a liquid tight seal of the hub in the journal box. The journal box is supported on a tubular column 38 which in turn connects to the tubular column 39 which are parts of the sump casting. The passageway 40 in the tube column 38 is plugged at the end by the cap screw 41. The passageway in the column 39 leads to a passageway 42 which returns the backwashing fluid to the fuel line between the low pressure pump and the high pressure pump (see Fig. 9).

For the speed reduction gearing to reduce the high rate of speed of the centrifuge drive shaft to the low rate of speed of the rotor inside the filter cage, I have shown a differential planetary gear set. The inner rapidly revolving shaft 12 has a central sun gear 43. The sun gear meshes with the star gear 44 which in turn meshes with the stationary internal ring gear 45. The outer slow turning shaft 11 has a saucer shaped member 46 fastened to its lower end and in this is fixed an internal ring gear 47 of the second set of planetary gears. The star gear 44 is fast to a secondary star gear 44A that is rotatably secured on shaft 48 on the arm 49 which turns on the center hub of the wheel 46. The star gear 44A at the left is slightly smaller than the star gear at the right on the shaft 48. Likewise is ring 47 in its relationship to ring gear 45. The sun gear meshes with the two right hand star gears and being much smaller than the star gears causes the star gears to rotate at much less speed than the sun gear. The star gears meshing with the stationary ring gear causes the arms 49 to travel in revolution around the rapidly rotating drive shaft 12. This travel is at a very much less rate than the speed at which the star gears revolve. The left hand star gears rotate the ring gear at a very much reduced rate. The net result of these gear reductions is that 3,000 R. P. M.'s of inner shaft 12 is reduced to 8½ R. P. M.'s of rotor supporting shaft 11 or 353 to 1.

One of the features of my automatic self-purging filter is that the valve that controls the diverted liquid that performs the purging action is automatically controlled to adapt the flow to the pressure in the system. As previously stated, the pressure range may vary from approximately 80 pounds per square inch to even as high as 1,000 pounds per square inch.

It is desirable to have a low amount of fuel diverted from the burners to do the purging. For instance, where the fuel line handles a maximum of 75 gallons of fuel a minute we find it desirable to divert only 1¼ gallons a minute to do the backwashing or purging. If the pressure in the fuel line was always the same, a valve or some other control or device could be set to divert the desired volume; but in these jet engines the pressure ranges anywhere from 80 pounds per square inch to something like 1,000 pounds per square inch. Under these circumstances a valve having a set opening would divert a varied amount of the liquid depending upon the pressures in the line. Consequently, I have provided in my system a control valve in which at low pressures the valve is quite open and at higher pressures the valve is opened very much less, in fact at very high pressures the valve may be opened only a few 1000 of an inch.

Figure 3:
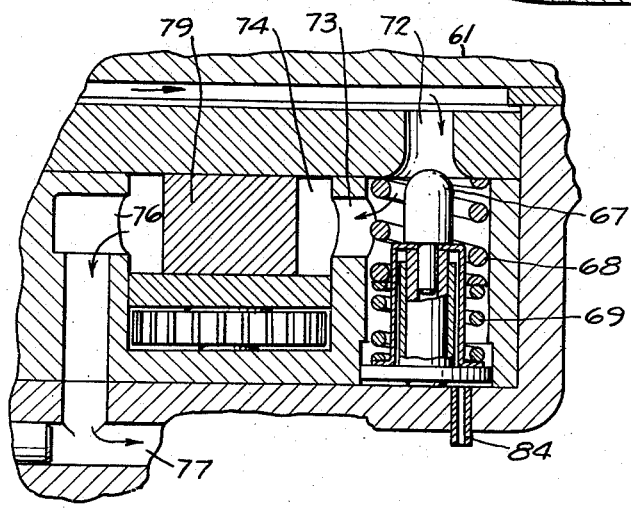
Fig. 3 is a cross section through the motor on the lines 3—3 of Fig. 2.
Figure 7:
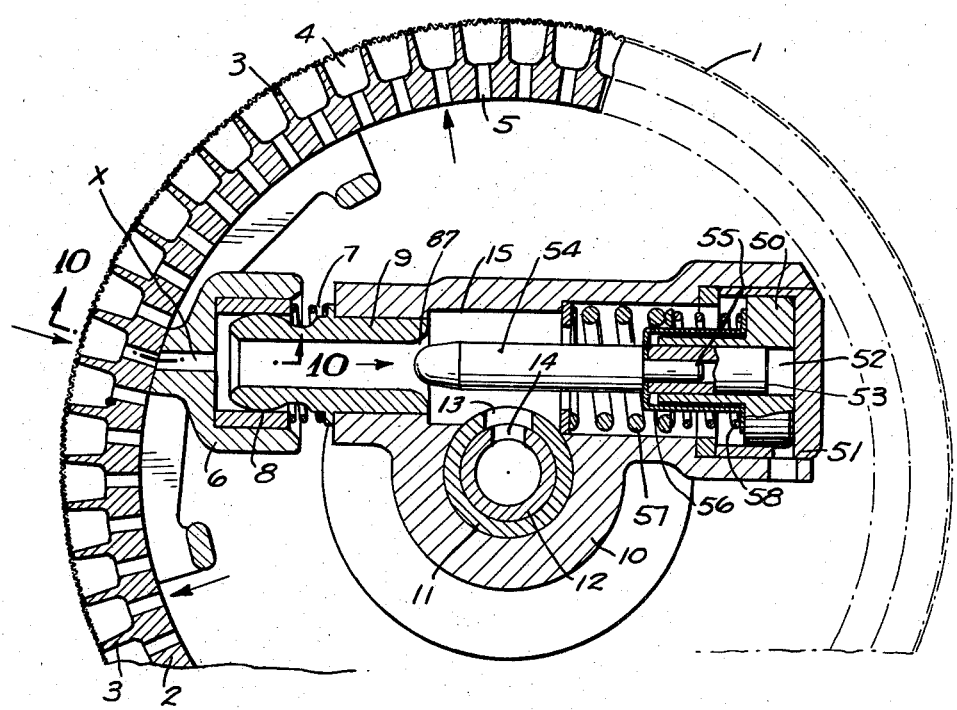
Fig. 7 is a fragmentary section through the filter casing and the rotor and its shoe.
Figure 8:
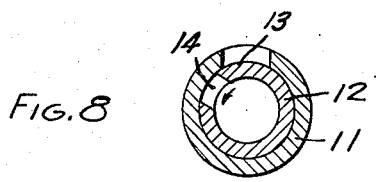
Fig. 8 is a section taken through the two hollow shafts.

Refer to Fig. 7: The rotor inside of the cage which supports the filter screen has a valve guide. This is the piston 50 guided in the cap 51 which fits into an end of the valve casing 10. This piston is bored at 52 and a valve 53 is guided in this bore. The valve 53 is made up of two cylindrical sections, one the valve proper 54 and the other the valve section which fits over the reduced end 55 of the valve portion 54. Trapped between these two valve sections is a flanged cup 56. About this flanged cup and the valve section 54 are the two coil springs, one 57 which is a fairly strong spring and the other 58 which is a light spring. These are so nicely calculated and guaged that they nearly counter balance the forces on the end of the valve section 53 which tend to close the valve. This valve section is of slightly less diameter than the other section. This is more apparent in the same kind of valve shown in Fig. 3.

The relationship of the areas of the valve head and its seat 87 together with the frictional characteristics of the fluid passing over the head of the valve is related to the area of the piston section and the pressures to which it is subjected are such that under conditions of low pressures, the valve will assume a certain relative position in respect to its seat. With proper spring characteristics in the spring series 57 and 58 under conditions of high pressures, the force exerted on the head of the piston section of the valve is greater than the combined pressure force on the head of the valve and the frictional drag of the fluid passing same, which relationship tends to move the valve toward its seat reducing the area through the valve in proper relationship so as to maintain over the wide pressure range an approximate continuity of flow volume.

This is a further action taking place on the part of the valve. As the shoe rotates in its raceway, the slot in same successively registers with the slots in the cage and the bridges between the slots in the raceway for the shoe. When the shoe slot and the cage slot are in registry the pressure conditions existing on the control valve are as previously described. However, when the shoe slot passes over the bridge or space between the cage slots, then the pressure existing on the end of the valve is momentarily removed and an ascendancy of force is then provided on opposite end of the valve, tending to drive the valve toward its seat. In order to get this action by blocking the fluid that passes from the shoe to the underside of the valve, the bridge must be wider than the passageway leading out of the shoe.

With the shoe rotating approximately 8½ revolutions per minute and traversing 60 slots per revolution, a pulsating action is introduced on the valve having a frequency of about 8½ cycles per second, which action provides a means for cracking any globular ice that may be tending toward glazing in the annulus around the valve head.

The valve has quite a large travel range from its maximum opening position to its completely closed position. When the valve is used with fuel pressures that are very high, then the force differentials on the top and bottom side of the controlling valve will be substantially greater and consequently the weak spring will go solid. And then the stronger spring will come into action and this will yield less to the higher differential forces and consequently as the valve approaches the near closing position the spring series more powerfully resist the closing. The same kind of valve is used in connection with the hydraulic motor.

Figure 2:
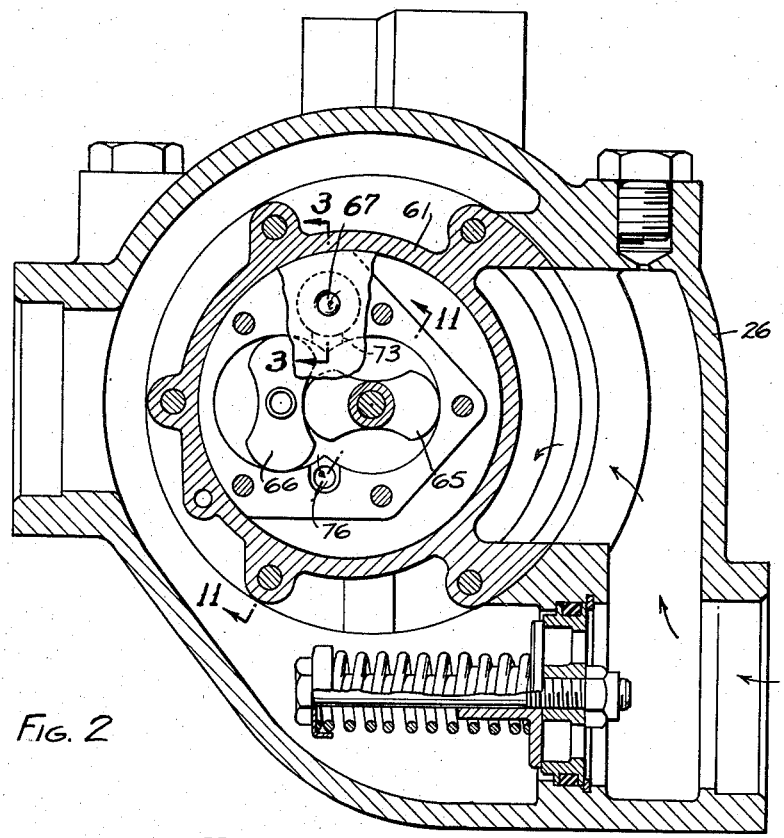
Fig. 2 is a cross section through the motor on the lines 2—2 of Fig. 1.
Figure 11:
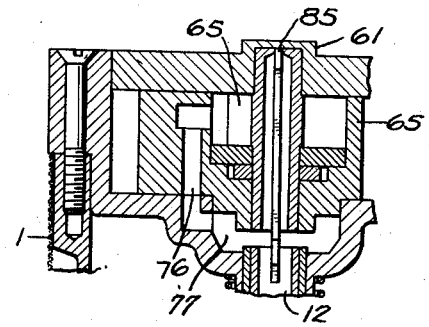
Fig. 11 is a fragmentary section through the stator at the joint between the rotor shaft and the centrifuge shaft.
Figure 12:
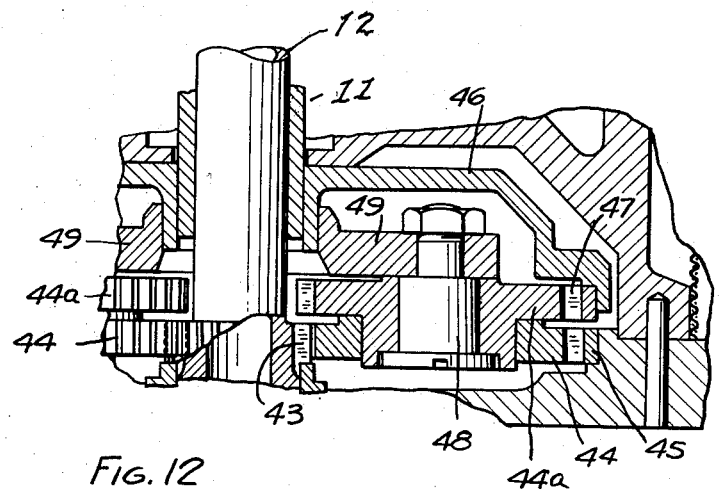
Fig. 12 is a section through the star gears of the reduction gearing.

Refer to Fig. 2: The hydraulic motor is shown. The purified liquid which is on the outside of the screen passes into the stator through the opening 63 (Fig. 1) then into the narrow chamber 79 which is at a side of the wall 61 which encloses the two rotors 65 and 66. From the chamber 79 the fluid passes through the port 72, which has a valve seat 87 at the upper end. Valve 67 is pressed open by the weak spring 69 and the strong spring 68 together with the force differential between the purified liquid acting on the valve seat end of the valve and the non-purified liquid coming through port 84 (Fig. 3) and acting on the piston end of the valve remote from the valve seat. This is the same arrangement and setup as is used in connection with the valve in the rotor and shoe in the cage, which has already been described. The fluid after passing around the valve, passes through the port 73 into the chamber 74 where it presses on the two 8 shaped rotors causing them to revolve and causing the rotor 65 to revolve the inner shaft 12 by quill 85 (see Fig. 11). This is a "Root" or "Lobar" type motor. The liquid is discharged through the port 76 and passageway 77 to the backwash fluid line through the centrifuge and to the inlet side of the high pressure pump. The course of the liquid is described in detail in column 4, lines 63 to 75, and column 5, lines 1 to 3.

What I claim is:

1. A filter and particle separator for the fuel used in the burners of jet engines having in combination a casing, a centrifugal separator in the casing having a rotating impeller, a cage in the casing of circular cross section having an inside wall, filter media supported by the cage, a rotor on the inside of the cage and filtering media provided with a passageway leading to said separator, and a single power means arranged for slowly rotating the rotor on the inside of the cage to successively connect the portions on the inside of the filtering media with the separator and the low pressure side of the high pressure pump to thereby successively backwash small areas of the filter to disengage the material collected on the filtering media and direct it to the separator and also for rotating the impeller at high speed.

2. The combination claimed in claim 1 in which the cage has a plurality of slots, and the rotor has a purging arm with a passageway which successively registers with said slots and permits a back flow of fluid resulting from the system's line pressure on one side and the lower pressure existing in the passageway of the purging arm as established by a valve member.

3. The filter apparatus claimed in claim 1 in which the cage has a plurality of slots and is provided with the filter media on its outer periphery, and the rotor has a rotating purging arm on the inside with a shoe having a passageway which successively registers with said slots and the solid portion of the cage between the slots to cut off the pressure momentarily on a backwash control valve to cause said valve to slap closed each time the passageway of the shoe passes over the solid portion between the slots.

4. A filter element cage as described in claim 1, so divided in the number of flutes to effect a velocity of the backwashing fluid equal to that of the fluid as it flows through the filter media in its normal circuit.

5. The combination claimed in claim 1 in which the power source is a hydraulic motor contained within the filter and separator housing.

6. The combination claimed in claim 1 in which the power means is a motor and in which there are a pair of shafts sleeved together, the exterior shaft driven at one end by a motor and having at the other end the centrifugal separator or centrifuge which is driven by the motor at a high speed, the outside shaft having fixed on the end remote from the centrifuge the rotor in the filter cage, a high ratio reduction gearing connecting the centrifuge end of the drive shaft with the end of the outer shaft remote from the rotor to thereby rotate the rotor only a few times a minute.

7. The combination claimed in claim 6 in which the reduction gearing takes the form of a set of differential planetary gears.

8. The combination claimed in claim 1 in which the rotor has a ball on which is fitted a shoe with a passageway that connects with the passageway in the casing of the rotor, the said shoe being spring pressed against the inside wall of the cage which forms a raceway for the shoe as the rotor revolves.

9. A filtering apparatus for jet engines operating under various pressures in the fuel line having in combination a filter media, a cage for supporting the filter media, a rotor for backwashing successive areas of the filter media, and a valve for controlling the flow of the backwash fluid used in this connection within desired limits irrespective of changing pressures in the fuel line, in which the valve located in the liquid line leading to the filter media and which comprises a valve casing provided with a valve seat and a passageway controlled by a sliding valve member a guide member in said casing and having a bore in which the valve member reciprocates, a flanged cup fixed to the valve and having a flange that can abut the underside of the said guide member and spring means between an abutment in the casing and the flange of the cup to press the cup against the underside of the guide member and keep the valve open a definite amount depending upon the pressure in the filter assembly, the end of the valve adjacent the valve seat subjected to the pressure of the fluid after it passes through the filter and the other end of the valve subjected to the pressure of the fluid before it passes through the filter, the said spring means being nicely calculated to oppose the force differentials between the filtered and unfiltered fuel which regulates the opening to control the backwash flow in accordance with the needs under different pressures in the fuel line.

10. The combination claimed in claim 9 in which the spring means is a weak spring and a stiff coil spring operating in series.

11. The combination claimed in claim 6 in which a hydraulic motor driven by fluid under pressure taken from the fuel line drives the interior shaft and a sensitive valve is provided to control the amount of fuel diverted from the fuel line to the motor in accordance with the pressure of the fluid from the clean side of the filter media.

References Cited in the file of this patent

UNITED STATES PATENTS

| | | |
|---|---|---|
| 989,827 | Thiem | Apr. 11, 1911 |
| 1,995,648 | Rathbun | Mar. 26, 1935 |
| 2,101,211 | Britton | Dec. 7, 1937 |
| 2,167,322 | Cuno et al. | July 25, 1939 |
| 2,392,348 | Wallgren | Jan. 8, 1946 |
| 2,403,602 | Kitto | July 9, 1946 |
| 2,560,874 | Kelso | July 17, 1951 |
| 2,675,253 | Stade | Apr. 13, 1954 |

FOREIGN PATENTS

| | | |
|---|---|---|
| 843,730 | France | July 10, 1939 |
| 563,831 | Great Britain | Aug. 31, 1944 |